United States Patent
Sadan (10) Patent No.: US 8,158,098 B2
(45) Date of Patent: Apr. 17, 2012

(54) PROCESSES FOR PREPARATION OF COMPOSITIONS COMPRISING POTASSIUM CHLORIDE

(75) Inventor: Abraham Sadan, Park City, UT (US)

(73) Assignee: Exportadora de Sal, S.A. de C.V., Guerrero Negro (MX)

( * ) Notice: Subject to any disclaimer, the term of this patent is extended or adjusted under 35 U.S.C. 154(b) by 0 days.

(21) Appl. No.: 12/820,882

(22) Filed: Jun. 22, 2010

(65) Prior Publication Data

US 2011/0008243 A1  Jan. 13, 2011

Related U.S. Application Data

(60) Provisional application No. 61/219,728, filed on Jun. 23, 2009.

(51) Int. Cl.
    *C01D 3/06* (2006.01)
(52) U.S. Cl. ............ 423/499.1; 423/158; 423/164; 423/184; 423/499.4; 23/297; 23/298
(58) Field of Classification Search .......... 423/158, 423/164, 184, 463, 499.1, 499.4; 23/297, 23/298
See application file for complete search history.

(56) References Cited

U.S. PATENT DOCUMENTS

| | | | |
|---|---|---|---|
| 2,394,570 A | | 2/1946 | Charles |
| 3,099,528 A | * | 7/1963 | Hadzeriga ................ 423/157 |
| 3,615,174 A | | 10/1971 | Lewis |
| 3,642,454 A | | 2/1972 | Nylander |
| 3,980,593 A | * | 9/1976 | Knorre et al. .............. 252/383 |
| 4,140,747 A | * | 2/1979 | Sadan ......................... 423/163 |
| 4,271,131 A | * | 6/1981 | Brown et al. ............ 423/179.5 |
| 7,014,832 B2 | | 3/2006 | Vohra |
| 2003/0080066 A1 | * | 5/2003 | Vohra et al. .................. 210/714 |
| 2005/0220697 A1 | * | 10/2005 | Vohra et al. ................ 423/499.1 |

FOREIGN PATENT DOCUMENTS

| | | |
|---|---|---|
| BR | 8107507 | 10/1982 |
| DE | 540473 | 12/1931 |
| DE | 2219340 | 11/1973 |
| FR | 663 054 A | 8/1929 |
| RO | 44202 | 9/1966 |
| SE | 95638 | 5/1939 |

OTHER PUBLICATIONS

Fernandez-Lozano J.A., Fourth Symposium on salt: [Held in Houston, Texas on Apr. 8-12, 1973], Cleveland Ohio: Northern Ohio Geolog. Soc. US, Jan. 1, 1974, pp. 501-510.
Sverdeup et al., The Oceans Their Physics, Chemistry and General Biology, 1942, p. 165-227.
English Translation of BR 8107507 listed under B02, Oct. 1982.
English Translation of DE 2219340 listed under B03, Nov. 1973.
English Translation of SE 95638 listed under B04, May 1939.
English Translation of DE 540473 listed under B05, Dec. 1931.
Angino et al. "Lithium content of seawater by atomic absorption spectrometry," Geochimica et Cosmochimica Acta, 1966, 30: page Nos. 153-158.
Riley et al. "The lithium content of sea water," Deep-sea research and Oceanographic Abstracts 1964, 11: page Nos. 563-568.
Sverdeup et al., The Oceans Their Physics, Chemistry and General Biology, 1942, page Nos. 165-227.
Baseggio, Fourth Symposium on Salt, vol. II, 1974, page Nos. 351-358.

* cited by examiner

*Primary Examiner* — Ngoc-Yen Nguyen
(74) *Attorney, Agent, or Firm* — Jones Day (57) ABSTRACT

Provided herein are processes for obtaining sylvinite and/or sylvite from sea water, sea bitterns and/or sea salts. The processes comprise reacting sea water, sea bitterns and/or sea salts with calcium hydroxide and/or calcium oxide.

27 Claims, 4 Drawing Sheets

PRODUCTION OF SYLVITE BY COOLING

PROCESSES FOR PREPARATION OF COMPOSITIONS COMPRISING POTASSIUM CHLORIDE

1. RELATED APPLICATIONS

This application claims priority to U.S. Provisional Patent Application No. 61/219,728, filed Jun. 23, 2009, the contents of which is incorporated herein by reference in its entirety.

2. FIELD

Provided herein are processes for obtaining sylvinite (mixture of KCl and NaCl) and/or sylvite (KCl) from sea water, sea bitterns and/or sea salts, including, but not limited to, kainite ($MgSO_4.KCl.3H_2O$), and carnallite ($MgCl_2.KCl.6H_2O$). Further provided are compositions prepared by the processes and methods of using the compositions.

3. BACKGROUND

Potassium chloride, potash or sylvite is mainly used as a fertilizer, either as single fertilizer or in combination with other plant nutrients. Potassium chloride is also used in several industries like dyes, soaps, detergents, food, pharmaceuticals and as starting material for preparing other potassium chemicals like potassium hydroxide and potassium carbonate.

When sea water is evaporated, various sea salts precipitate. Generally, the order of precipitation of sea salts is as follows: halite or sodium chloride (NaCl), epsomite ($MgSO_4.7H_2O$), kainite ($MgSO_4.KCl.3H_2O$), and carnallite ($MgCl_2.KCl.6H_2O$)— epsomite ($MgSO_4.7H_2O$) mixture. Sodium chloride is mixed in all precipitated salts in various quantities. Potassium chloride does not precipitate from sea water. Potassium chloride is recovered from sulfate free terminal lakes like the Dead Sea and Bonneville Lake or is mined either by solution mining or by regular mining. In order to obtain potassium chloride from sea water, sulfates need to be removed from the water.

The removal of sulfate can be achieved by refrigeration or cooling of the sea water bitterns to subzero degrees to remove epsomite, $MgSO_4.7H_2O$. The low sulfate bitterns is then evaporated to provide carnallite that can be processed to obtain potassium chloride. Refrigeration cannot remove all sulfates. Thus, potassium chloride obtained by this process is contaminated with sulfates to some extent.

In order to achieve complete removal of sulfates, use of calcium chloride has been tried by several researchers. Calcium chloride reacts with epsomite to precipitate gypsum, $CaSO_4.2H_2O$. However, this is an expensive process.

Several attempts have been reported using carnallite to obtain potassium chloride. However, carnallite from sea water contains epsomite, and potassium chloride obtained from seawater carnallite is contaminated with epsomite.

U.S. Pat. No. 3,099,528 discloses a process to produce KCl via sylvinite obtained from crude carnallite. In this process calcium chloride is used to desulfate the brine. As discussed above, this is an expensive route.

U.S. Pat. No. 7,014,832 reports an integrated process for the simultaneous recovery of industrial grade potassium chloride and low sodium edible salt with overall KCl yield of 90 to 95%. The process comprises removal of sulfates from bitterns with a solution of calcium chloride; subjecting the desulfated bittern to evaporation; mixing the concentrated desulfated bittern with a concentrated solution of $MgCl_2$ to obtain carnallite and further obtaining KCl. This is an expensive route due to cost of raw materials and process steps involved.

U.S. Patent Publication No. 2003/0080066 discloses an integrated process for recovery of high purity potassium chloride, and end bittern containing 7.5 g/L bromine. The process is based on desulftation of brine with distiller waste of soda ash industry or calcium chloride generated from limestone and acid. The process has limited applicability due to requirement of distiller waste and the carnallite obtained is contaminated with high extent of NaCl necessitating further purification.

PCT International Publication No. WO/2003/064323 discloses a method of producing KCl-enriched low sodium salt from bittern. This process also uses calcium chloride and is expensive.

US 2005/0220697 and WO/2005/063625 describe treatment of carnallite decomposition liquor (CDL) with lime (CaO) to obtain KCl. The publication describes that CDL is obtained by processing bittern by following the steps described.

BR 8107507 described recovery of alkali metal halides, alkaline earth metal halides, and $Mg(OH)_2$ from final brines (the mother liquor remaining after the 1st crop of NaCl from seawater). The process involves NaCl and $CaCO_4$ removal by evaporation and crystallization, $Ca(OH)_2$ addition to permit Mg precipitation and removal as insoluble $Mg(OH)_2$, brine reconcentration, and removal and separation of a mixture of NaCl and KCl crystals. The process is carried out in a system of agitators, filters, evaporators, grinders, flotation cells, and thickeners.

DE 2219340 described that mother liquor of salt evaporation pond is reacted with calcium chloride for the purpose of desulfating and then evaporated to precipitate sodium chloride and carnallite. The carnallite is subjected to a cold decomposition process with water to obtain potassium chloride.

SE 95638 describes processes for extracting NaCl from sea water as well as, other substances in their original or changed forms. The processes involves concentration of the sea water by freezing the water to form ice crystals that are separated from the solution gradually. The concentrated solution is further processes to obtain sodium chloride and other salts.

Although, there have been many attempts reported in the literature to obtain potassium chloride compositions from sea water, there continues to be a need for cost-effective and efficient processes for production of compositions comprising potassium chloride and sylvinite from sea water, bitterns and sea salts.

4. SUMMARY

In certain embodiments, provided herein are processes for obtaining sylvinite (a mixture of potassium chloride and sodium chloride) from sea water, sea bitterns and/or sea salts. In certain embodiments, provided herein are processes for production of sylvite (potassium chloride) from sea water, sea bitterns and/or sea salts.

In certain embodiments, provided herein are processes for removal of sulfate and magnesium ions from sea bitterns to provide magnesium and sulfate free bitterns.

In certain embodiments, provided herein are processes for removal of sulfate and magnesium ions from sea salts, such as kainite and carnallite, to provide magnesium and sulfate free salts.

In certain embodiments, the processes provided herein comprise reacting sea water, sea bitterns and/or sea salts with calcium hydroxide and/or calcium oxide to remove sulfate and magnesium. In certain embodiments, the sulfate and magnesium free sea water or sea bittern is evaporated to obtain sylvinite. In certain embodiments, the sylvinite is further processed to obtain sylvite.

In certain embodiments, the processes provided herein comprise evaporation of sea water or sea bittern to obtain a solution containing a mixed salt comprising predominantly kainite and further comprising sodium chloride. In certain embodiments, the kainite and sodium chloride mixed salt is reacted with $Ca(OH)_2$ and/or CaO to yield and an end sylvinite solution and a precipitate. In certain embodiments, sylvinite and/or sylvite is recovered from the end sylvinite solution and/or the precipitate.

In certain embodiments, the processes provided herein comprise evaporation of sea water or sea bittern to obtain a solution containing a mixed salt comprising predominantly kainite and further comprising sodium chloride. In certain embodiments, the sodium chloride is present as coarse particles. In certain embodiments, the kainite and sodium chloride mixed salt is reacted with $Ca(OH)_2$ and/or CaO to yield a slurry comprising $CaSO_4.2H_2O$, $Mg(OH)_2$, NaCl and KCl. In certain embodiments, the slurry comprises coarse NaCl and fine particles comprising $CaSO_4.2H_2O$, $Mg(OH)_2$, and KCl. In certain embodiments, the fine particles are removed from the coarse particles by screening and filtration. In certain embodiments, KCl from the fine particles is leached to provide a solution containing KCl. In certain embodiments the KCl solution is evaporated to yield high grade sylvite, KCl.

In certain embodiments, the reaction of kainite and NaCl mixture with CaO and/or $Ca(OH)_2$ is carried out at near boiling temperature to provide a slurry containing $CaSO_4.2H_2O$, $Mg(OH)_2$, NaCl and KCl. The slurry when filtered yields solids containing $CaSO_4.2H_2O$, $Mg(OH)_2$, and NaCl, and a filtrate containing a concentrated solution of predominantly KCl. In certain embodiments, the filtrate is cooled to an ambient temperature to provide sylvite, KCl.

In certain embodiments, the reaction of kainite and NaCl mixture with CaO and/or $Ca(OH)_2$ is carried out to provide a slurry containinig $CaSO_4.2H_2O$, $Mg(OH)_2$, NaCl and KCl. In certain embodiments, the solids are filtered and the filtercake is leached at an elevated temperature to obtain KCl. In certain embodiments, the leaching is carried out at a temperature of greater than about 40° C., 50° C., 60° C., 70° C., or 80° C. In certain embodiments, the leaching is carried out at a temperature of between about 40° C. to 100° C., about 40° C. to 80° C., about 40° C. to 70° C., about 50° C. to 100° C., about 60° C. to 100° C. or about 70° C. to 100° C.

In certain embodiments, the reaction of kainite and NaCl mixture with CaO and/or $Ca(OH)_2$ is carried out in the presence of a sylvinite solution. In certain embodiments, the reaction of kainite and NaCl mixture with CaO and/or $Ca(OH)_2$ is carried out in the presence of a saturated solution of NaCl containing small amounts of KCl. In certain embodiments, the saturated solution of NaCl allows dissolution of KCl in kainite yielding a slurry of $CaSO_4.2H_2O$, $Mg(OH)_2$ and NaCl solids and a saturated solution of sylvinite. The saturated solution of sylvinite is further processed to yield either sylvinite or KCl. The filter cake can be washed and further used in sheet rock boards or disposed off.

In certain embodiments, the processes provided herein comprise evaporating bitterns to provide kainite. In certain embodiments, kainite is further processed to provide sylvinite. In certain embodiments, sylvinite is further processed to yield sylvite, KCl.

In certain embodiments, the processes provided herein comprise evaporation of sea water or sea bittern to obtain a solution containing a mixed salt comprising predominantly carnallite and further comprising epsomite and sodium chloride. In certain embodiments, the carnallite, epsomite and sodium chloride mixed salt is reacted with $Ca(OH)_2$ and/or CaO in presence of a sylvinite solution to yield an end sylvinite solution and a precipitate. In certain embodiments, sylvinite and/or sylvite is recovered from the end sylvinite solution and/or the precipitate.

In certain embodiments, the processes provided herein comprise evaporating bitterns to provide kainite. In certain embodiments, kainite is further processed to provide sylvinite. In certain embodiments, sylvinite is further processed to yield sylvite, KCl.

In certain embodiments, the processes provided herein comprise evaporating sulfate free bitterns to provide carnallite. In certain embodiments, canallite is further processed to provide sylvinite. In certain embodiments, sylvinite is further processed to yield sylvite, KCl.

In certain embodiments, the processes further comprises leaching sylvinite in water at about 80-100° C. or higher temperature to leach potassium chloride in solution. Sodium chloride remains as solid. Since, the solubility of potassium chloride increases with temperature and the solubility of sodium chloride is not affected with temperature change, the solid sodium chloride is separated and the hot solution comprising potassium chloride is cooled to obtain potassium chloride.

In certain embodiments, the processes further comprise mixing sylvinite in water from about 0° C. to about 10° C. Sodium chloride dissolves and potassium chloride remains as solid. The solid comprising potassium chloride is centrifuged and separated.

In certain embodiments, potassium chloride obtained in the processes provided here is used as a fertilizer or a component in a fertilizer. In one embodiment, sylvinite obtained by the processes provided herein is used as a low sodium salt.

6. DETAILED DESCRIPTION OF THE INVENTION

Provided herein are processes for production of compositions comprising potassium chloride from sea water, sea bitterns and/or sea salts.

6.1 Definitions

Unless defined otherwise, all technical and scientific terms used herein have the same meaning as is commonly understood by one of ordinary skill in the art. All patents, applications, published applications and other publications are incorporated by reference in their entirety. In the event that there are a plurality of definitions for a term herein, those in this section prevail unless stated otherwise.

As used herein, natural water or water refers to water from any natural source, such as ocean, sea, brackish, lakes, such as salt lake or regular underground water.

As used herein, oceans and sea refers to all the connected seas with currents, and are home to living sea beings.

As used herein, terminal lakes are lakes receiving waters but do not have a way to let any water out, but by evaporation. The Salton sea is an example of a terminal lake.

As used herein, a crystallization pond is a pond in which salt crystallizes. The Dead Sea is an example of a salt crystallization pond.

As used herein, kainite refers to a hydrated salt predominantly containing $MgSO_4.KCl.3H_2O$.

As used herein, carnallite refers to a hydrated salt predominantly containing $MgCl_2.KCl.6H_2O$.

As used herein, sylvinite refers to a mixture of potassium chloride and sodium chloride at all ratios.

As used herein, sylvinite solution refers to a solution comprising KCl and NaCl. In certain embodiments, the sylvinite solution is saturated with respect to both NaCl and KCl. In certain embodiments, the sylvinite solution is saturated with respect to NaCl, and under saturated with respect to KCl. In certain embodiments, the sylvinite solution is under saturated with respect to both NaCl and KCl.

As used herein end sylvinite solution refers to a sylvinite solution that is obtained after a reaction of kainite-NaCl sea salt or carnallite-NaCl sea salt with CaO and/or $Ca(OH)_2$. In certain embodiments, the end sylvinite solution is further processed to obtain sylvinite and/or sylvite.

As used herein sylvite refers to high grade potassium chloride. In certain embodiments, the purity of potassium chloride is about 40%, 50%, 60%, 70%, 80%, 90%, 95%, 99% or more. In certain embodiments, the purity of potassium chloride is about 90%, 95%, 99% or more.

As used herein, gypsum refers to $CaSO_4.2H_2O$.

As used herein, epsomite refers to $MgSO_4.7H_2O$.

As used herein, harvesting refers to collecting salts from the pond.

As used herein, bitterns refer to concentrated magnesium water or brine remaining after sodium chloride has been precipitated.

As used herein, pond refers to a ground area confined by dykes from all sides to contain water, bitterns or salts obtained at various stages in the processes provided herein.

As used herein, predominantly refers to about 40% or greater. In one embodiment, predominantly refers to greater than about 40%, 45%, 50% 55%, 60%, 65%, 70%, 75%, 80%, 85%, 90%, 95% or 100%. In one embodiment, predominantly refers to about 40%, 45%, 50% 55%, 60%, 65%, 70%, 75%, 80%, 85%, 90%, 95% or 100%. For example, "kainite predominantly containing $MgSO_4.KCl.3H_2O$" means the amount of $MgSO_4.KCl.3H_2O$ double salt in kainite is more than about 40%, 45%, 50%, 55%, 60%, 65%, 70%, 75%, 80%, 85%, 90%, 95% or 100%. In another example, "carnallite predominantly containing $MgCl_2.KCl.6H_2O$" means the amount of $MgCl_2.KCl.6H_2O$ double salt in carnallite is more than about 40%, 45%, 50%, 55%, 60%, 65%, 70%, 75%, 80%, 85%, 90%, 95% or 100%.

As used herein, % purity of potassium chloride refers to the amount of potassium chloride in the product. The process provided herein provide at least about 80% pure potassium chloride. In certain embodiments, the purity of potassium chloride is about 40%, 50%, 60%, 70%, 80%, 90%, 95%, 99% or more. In certain embodiments, potassium chloride obtained by the processes provided herein is about 90%, 95%, 99% or more pure.

As used herein, near or shy of boiling temperature refers to about 100° C.

As used herein kainite-NaCl sea salt refers to a mixture of kainite and NaCl. In certain embodiments, the kainite-NaCl sea salt comprises predominantly kainite. In certain embodiments of the processes herein, the kainite-NaCl sea salt is reacted with CaO and/or $Ca(OH)_2$ to obtain sylvinite and/or sylvite. In certain embodiments, the total amount of kainite in the kainite-NaCl sea salt is about or greater than about 40%, 45%, 50%, 60%, 65%, 70%, 75%, 80%, 85%, 90%, or 95%.

As used herein carnallite-NaCl sea salt refers to a mixture of carnallite and NaCl. In certain embodiments, the carnallite-NaCl sea salt comprises predominantly carnallite. In certain embodiments of the processes herein, the carnallite-NaCl sea salt is reacted with CaO and/or $Ca(OH)_2$ to obtain sylvinite and/or sylvite. In certain embodiments, the total amount of carnallite in the carnallite-NaCl sea salt is about or greater than about 40%, 45%, 50%, 60%, 65%, 70%, 75%, 80%, 85%, 90%, or 95%.

6.2 Processes

Provided herein are processes for production of compositions comprising potassium chloride from sea water, sea bitterns and/or sea salts. In one aspect, the processes comprise evaporation of sea water or sea bittern to obtain a mixed salt containing kainite and sodium chloride. In certain embodiments, kainite starts precipitating when sea water or bitterns reach magnesium concentration of about 3.5% or greater by weight based on total weight of bitterns. In certain embodiments, kainite precipitates when the magnesium concentration of bitterns is between about 3.5% to about 8% by weight based on total weight of bitterns. In certain embodiments, kainite precipitates when the magnesium concentration of bitterns is between about 3.5% to about 6.7% by weight based on total weight of bitterns. In one embodiment, kainite precipitates when the magnesium concentration of bitterns is about 3.5%, 5%, 6%, or 6.5% by weight based on total weight of bitterns. In one embodiment, kainite precipitates when the magnesium concentration of bitterns is about 3.5%, 5%, 6%, 6.5%, 6.7%, 7%, 7.5% or 8% by weight based on total weight of bitterns.

In certain embodiments, the processes provided herein use kainite and sodium chloride mixed salt as a starting feedstock for production of potassium chloride compositions. In certain embodiments, the kainite and sodium chloride mixed salt comprises about 6-8% Mg. In certain embodiments, the kainite and sodium chloride mixed salt comprises about 9-13% or about 10-12% K. In certain embodiments, the kainite and sodium chloride mixed salt comprises about 7-10% or about 7.5-9% Na. In certain embodiments, the kainite and sodium chloride mixed salt comprises about 28-30% $SO_4$. In certain embodiments, the kainite and sodium chloride mixed salt comprises about 20-24% Cl. In certain embodiments, the kainite and sodium chloride mixed salt comprises about 18-22% or about 18-20% water. In certain embodiments, the kainite and sodium chloride mixed salt comprises about 0.5-2% or about 1-2% insolubles by weight. In certain embodiments, the kainite and sodium chloride mixed salt comprises about 8% Mg, about 9.5% K, about 6.5% Na, and about 30% $SO_4$. In certain embodiments, the kainite and sodium chloride mixed salt comprises about 7.72% Mg, about 11.65% K, about 8.10% Na, and about 29.13% $SO_4$, about 22.46% Cl, about 19.94% water and about 1% insolubles by weight.

In certain embodiments, the process comprises reacting kainite and sodium chloride mixed salt with calcium hydroxide and/or calcium oxide and water, including sea water, to obtain a precipitate comprising calcium sulfate and magnesium hydroxide. In certain embodiments, the reaction is conducted at a temperature of at least about 80° C. or higher. In certain embodiments, the reaction is conducted at a temperature of at least about 80° C., 90° C., 100° C. or higher. The precipitate is removed to obtain a clear solution comprising sylvinite. In one embodiment, the solution is cooled to obtain precipitate of potassium chloride. The potassium chloride precipitate is separated from brine. In one embodiment, the brine is recycled to the feedstock. In certain embodiments, the solution comprising sylvinite is evaporated to obtain sylvinite. In one embodiment, the sylvinite is further processed to obtain sylvite, potassium chloride.

Figure 1:
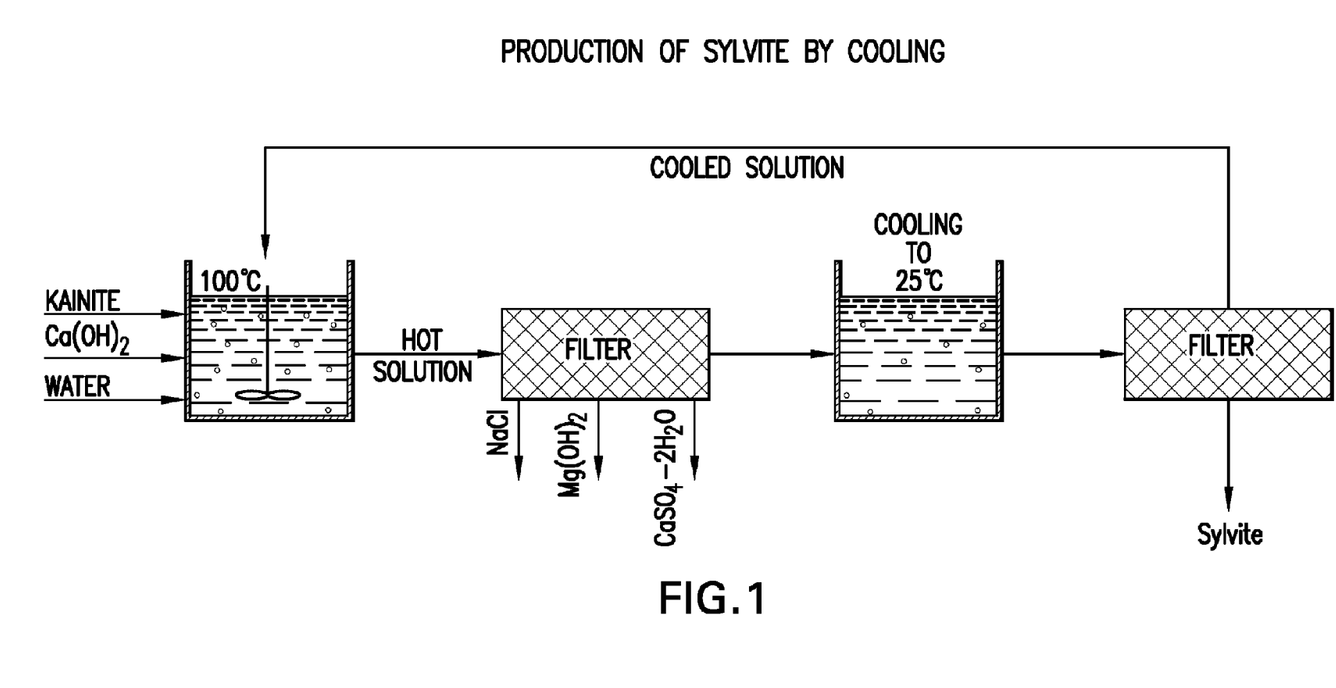
FIG. 1 provides a flow diagram for the reaction of calcium hydroxide with kainite-NaCl mixture and water at near boiling temperature to provide a slurry comprising $CaSO_4.2H_2O$, $Mg(OH)_2$ and excess NaCl, and a solution comprising about 22% KCl and about 17% NaCl by weight based on total weight of the solution. The slurry is filtered to remove $CaSO_4.2H_2O$, $Mg(OH)_2$ and the excess NaCl salts. The solution is cooled to provide potassium chloride. The cooled sylvinite brine comprising about 11% KCl and about 20% NaCl is returned to the reaction mixture.

In certain embodiments, the process for production of sylvite is conducted as schematically represented in FIG. 1. As demonstrated therein, the reaction of CaO and/or $Ca(OH)_2$ with kainite-NaCl mixture in presence of water is conducted at near boiling temperature to provide a slurry comprising $CaSO_4.2H_2O$, $Mg(OH)_2$ and excess NaCl, and a solution comprising KCl and NaCl. In certain embodiments, the solution comprises about 22% KCl and about 17% NaCl by weight based on total weight of the solution. The slurry is filtered to remove $CaSO_4.2H_2O$, $Mg(OH)_2$ and the excess NaCl salts. In certain embodiments, the solution is cooled to provide potassium chloride. In certain embodiments, the cooled sylvinite brine comprising about 11% KCl and about 20% NaCl is returned to the reaction mixture.

Figure 2:
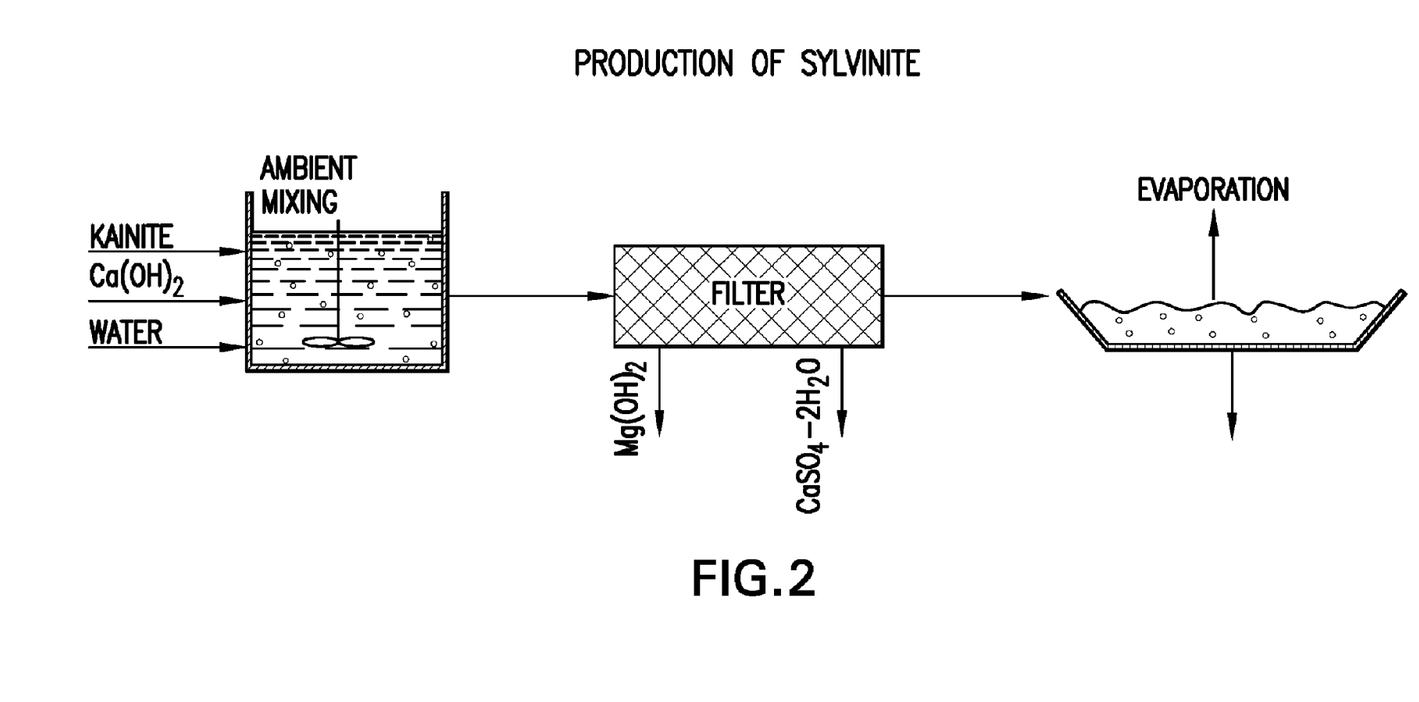
FIG. 2 provides a flow diagram for the reaction of the $Ca(OH)_2$ with kainite-NaCl mixture and water at ambient temperature to provide a slurry comprising $CaSO_4.2H_2O$ and $Mg(OH)_2$. The slurry is filtered to provide sylvinite solution which can be evaporated in solar crystallization ponds or in house to provide sylvinite that can be processed further to provide KCl.

In certain embodiments, the process for production of sylvinite is conducted as schematically represented in FIG. 2. As illustrated in FIG. 2, the reaction of the CaO and/or $Ca(OH)_2$ with kainite-NaCl mixture in presence of water is carried out at ambient temperature to provide a slurry comprising $CaSO_4.2H_2O$ and $Mg(OH)_2$. The slurry is filtered to provide sylvinite solution which can be evaporated in solar crystallization ponds or in-house to provide sylvinite that can be processed further to provide KCl.

In certain embodiments, the processes provided herein comprise evaporation of sea water or sea bittern to obtain a mixed salt comprising kainite and sodium chloride. In certain embodiments, the sodium chloride is present as coarse particles. In certain embodiments, the kainite and sodium chloride mixture is reacted with $Ca(OH)_2$ and/or CaO to yield a slurry comprising $CaSO_4.2H_2O$, $Mg(OH)_2$, NaCl and KCl. In certain embodiments, the reaction of kainite and sodium chloride mixed salt with calcium hydroxide or calcium oxide is carried out in presence of sylvinite solution. In certain embodiments, the slurry comprises coarse NaCl and fine particles comprising $CaSO_4.2H_2O$, $Mg(OH)_2$, and KCl. In certain embodiments, the fine particles are removed from the coarse particles by screening and filtration. In certain embodiments, KCl from the fine particles is leached to provide a solution containing KCl. In certain embodiments the KCl solution is evaporated to yield high grade sylvite, KCl.

Figure 3:
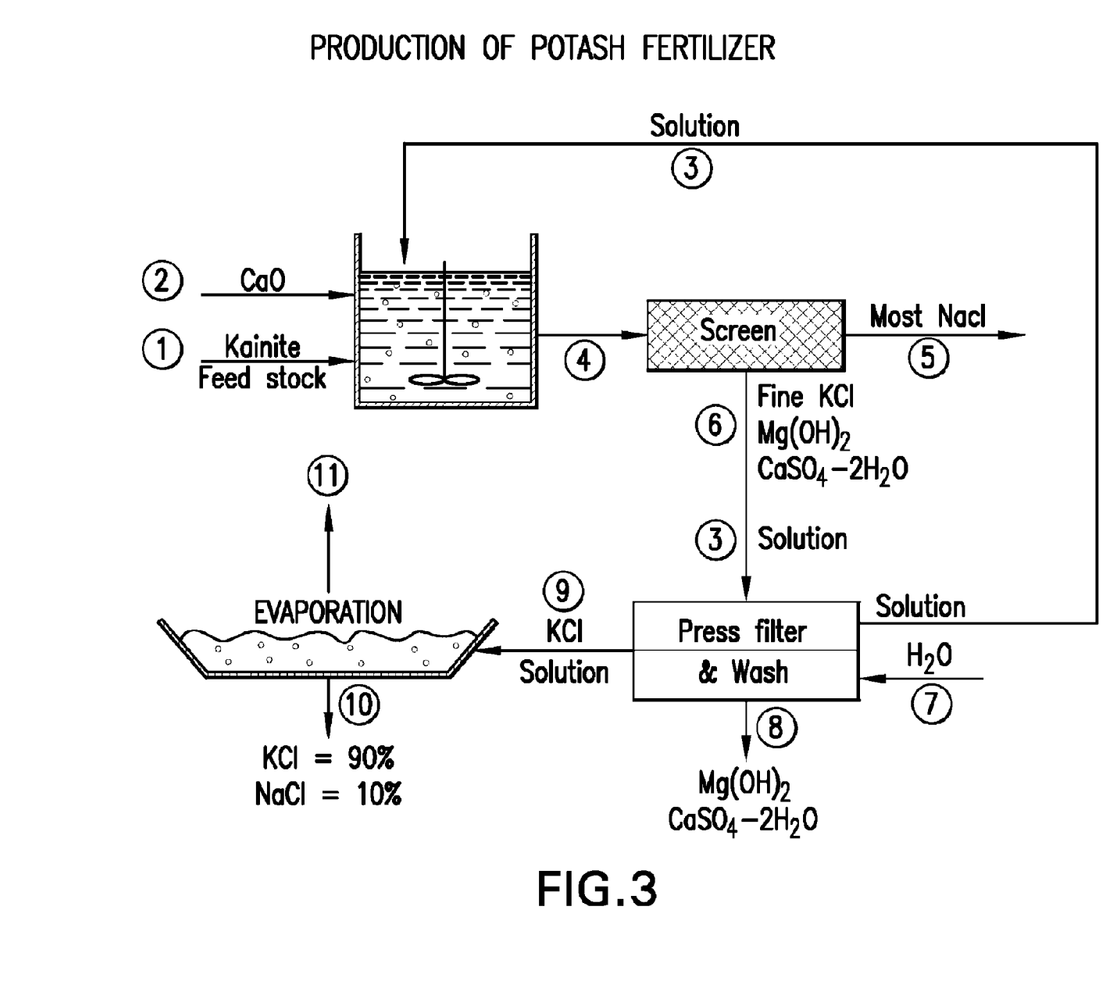
FIG. 3 provides a flow diagram for the reaction of $Ca(OH)_2$ with kainite-NaCl mixture and sylvinite solution at ambient temperature to provide a slurry comprising of fine KCl, $CaSO_4.2H_2O$ and $Mg(OH)_2$ and coarse NaCl. The slurry is screened to remove the coarse NaCl, the fines are filtered and further leached to provide KCl solution which can be evaporated by solar crystallization ponds or in house to provide KCl.

In certain embodiments, the process for production of sylvinite is conducted as schematically represented in FIG. 3. As illustrated in FIG. 3, the reaction of CaO and/or $Ca(OH)_2$ with kainite-NaCl mixture and sylvinite solution is conducted at an ambient temperature to provide a slurry comprising of fine KCl, $CaSO_4.2H_2O$ and $Mg(OH)_2$ and coarse NaCl. The slurry is screened to remove the coarse NaCl, and the fines are filtered. In certain embodiments, KCl from the fine particles is leached to provide a solution containing KCl. In certain embodiments the KCl solution is evaporated to yield high grade sylvite, KCl.

In certain embodiments, the reaction of kainite and NaCl mixture with CaO and/or $Ca(OH)_2$, optionally in presence of sylvinite solution, is carried out at near boiling temperature to provide a slurry containing $CaSO_4.2H_2O$, $Mg(OH)_2$, and NaCl. The slurry when filtered yields solids containing $CaSO_4.2H_2O$, $Mg(OH)_2$, and NaCl, and a filtrate containing a concentrated solution of predominantly KCl. In certain embodiments, the filtrate is cooled to an ambient temperature to provide sylvite, KCl.

In certain embodiments, the reaction of kainite and NaCl mixture with CaO and/or $Ca(OH)_2$ is carried out to provide a slurry containinig $CaSO_4.2H_2O$, $Mg(OH)_2$, NaCl and KCl. In certain embodiments, the solids are filtered and the filtercake is leached at an elevated temperature to obtain KCl. In certain embodiments, the leaching is carried out at a temperature of greater than about 40° C., 50° C., 60° C., 70° C., 80° C., 90° C., 100° C., 110° C., or 120° C. In certain embodiments, the leaching is carried out at a temperature of between about 40° C. to 120° C., about 40° C. to 80° C., about 40° C. to 70° C., about 50° C. to 120° C., about 60° C. to 120° C. or about 70° C. to 120° C.

In certain embodiments, the reaction of kainite and NaCl mixture with CaO and/or $Ca(OH)_2$ is carried out in the presence of a saturated solution of NaCl containing small amounts of KCl. In certain embodiments, the saturated solution of NaCl allows dissolution of KCl in kainite yielding a slurry of $CaSO_4.2H_2O$, $Mg(OH)_2$ and NaCl solids and a saturated solution of sylvinite. The saturated solution of sylvinite is further processed to yield either sylvinite or KCl. The filter cake can be washed and can be used for sheet rock boards.

In certain embodiments, the processes provided herein use kainite and sodium chloride mixed salt as a starting feedstock for production of potassium chloride compositions. In one embodiment, the kainite and sodium chloride mixed salt comprises about 8% Mg, about 9.5% K, about 6.5% Na, and about 30% $SO_4$. In one embodiment, the process comprises reacting kainite and sodium chloride mixed salt with calcium hydroxide or calcium oxide and saturated or undersaturated sylvinte solutions, to obtain a precipitate comprising calcium sulfate and magnesium hydroxide. In certain embodiments, the reaction is conducted at a temperature of at least about 80° C. In certain embodiments, the reaction is conducted at a temperature of at least about 80° C., 90° C., 100° C., 120° C. or higher. The precipitate is removed to obtain a clear solution comprising sylvite, KCl. In certain embodiments, the solution is cooled to obtain a precipitate of potassium chloride. The potassium chloride precipitate is separated from brine. In certain embodiments, the brine is recycled to the feedstock. In certain embodiments, the solution comprising sylvite is evaporated to obtain sylvite, KCl.

Figure 4:
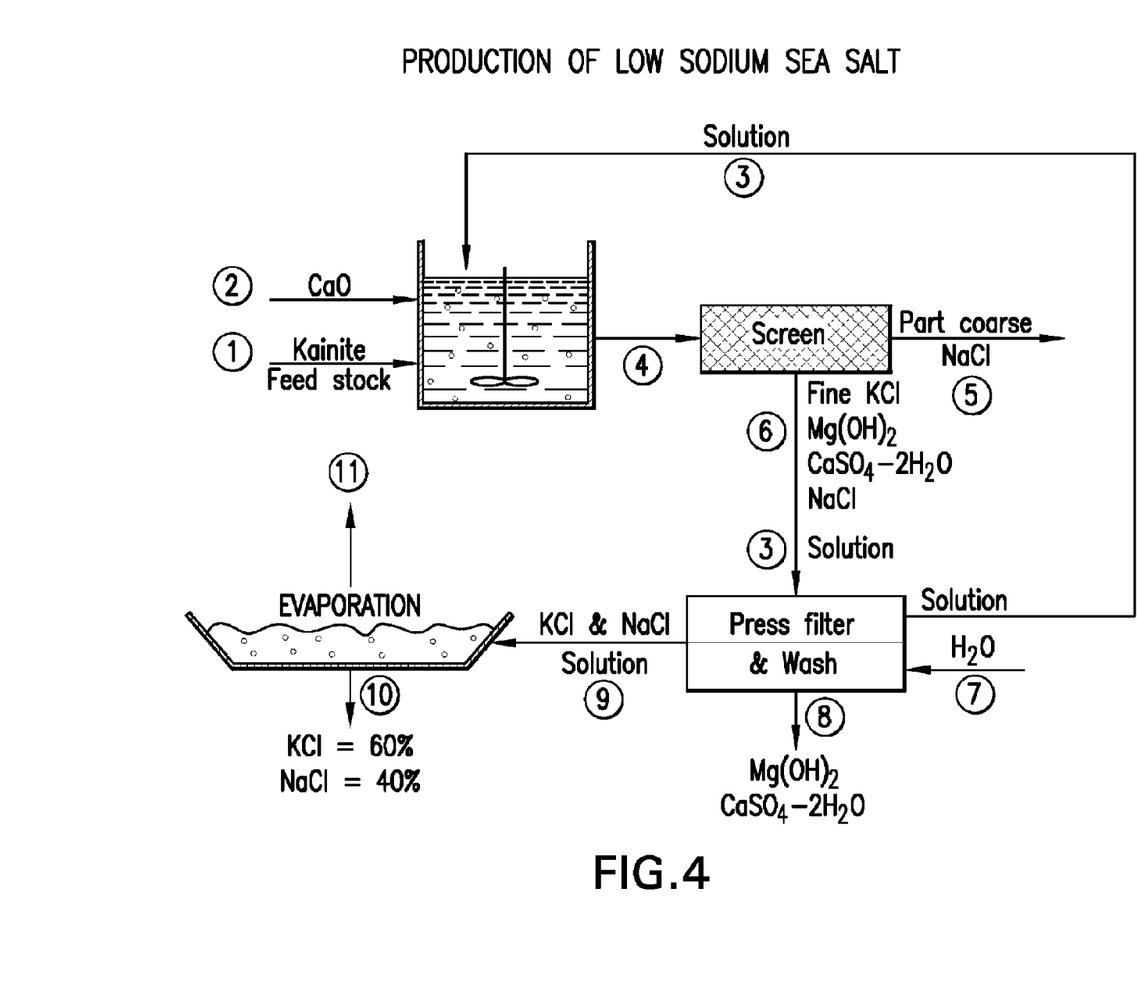
FIG. 4 provides a flow diagram for the reaction of $Ca(OH)_2$ with kainite-NaCl mixture and saturated NaCl solution containing KCl at less than saturation. The reaction is carried out at ambient temperature to provide a slurry comprising of fine $CaSO_4.2H_2O$ and $Mg(OH)_2$ and coarse NaCl and a saturated sylvinite solution with both NaCl and KCl. The saturated sylvinite solution is further processed to yield sylvite or KCl.

In certain embodiments, the process for production of sylvinite is conducted as schematically represented in FIG. 4. As illustrated in FIG. 4, the reaction of CaO and/or Ca(OH)$_2$ with kainite-NaCl mixture and saturated NaCl solution containing KCl at less than saturation is carried out at an ambient temperature to provide a slurry comprising of fine CaSO$_4$.2H$_2$O and Mg(OH)$_2$ and coarse NaCl and a saturated sylvinite solution with both NaCl and KCl. The saturated sylvinite solution is further processed to yield sylvite or KCl.

In one aspect, the processes provided herein comprise evaporation of sea water or sea bittern to obtain a mixed salt comprising predominantly carnallite, and further comprising epsomite and sodium chloride. In one embodiment, the carnallite, epsomite and sodium chloride mixed salt is used as the starting feedstock for production of potassium chloride. In certain embodiments, the carnallite and epsomite mixed salt starts precipitating when bitterns reach magnesium concentration between about 6.5% to 8% by weight based on total weight of bitterns. In certain embodiments, carnallite and epsomite mixed salt precipitates when the magnesium concentration of bitterns is between about 6.5%, 7%, 7.5% or about 8% by weight based on total weight of bitterns.

In one embodiment, the carnallite and sodium chloride mixed salt comprises about 8.3% Mg, about 8.0% K, about 3.6% Na, and about 13.3% SO$_4$. In one embodiment, the carnallite and sodium chloride mixed salt comprises about 7-10% or 8-10% Mg. In one embodiment, the carnallite and sodium chloride mixed salt comprises about 7-10% or 7.5-9% K. In one embodiment, the carnallite and sodium chloride mixed salt comprises about 2.5-4% or 3 to 4% Na. In one embodiment, the carnallite and sodium chloride mixed salt comprises about 11-14% SO$_4$. In one embodiment, the carnallite and sodium chloride mixed salt comprises about 26 to 29% Cl. In one embodiment, the carnallite and sodium chloride mixed salt comprises about 37-40% water. In one embodiment, the carnallite and sodium chloride mixed salt comprises about 8.32% Mg, about 8.04% K, about 3.6% Na, about 13.33% SO$_4$, about 27.82% Cl, and about 38.89% water. In one embodiment, the process comprises reacting carnallite and epsomite mixed salt with calcium hydroxide and/or calcium oxide in presence of water, including sea water, to obtain a precipitate comprising calcium sulfate and magnesium hydroxide and a solution comprising sylvinite. In certain embodiments, the reaction of carnallite and epsomite mixed salt with calcium hydroxide and/or calcium oxide is carried out in presence of sylvinite solution. In certain embodiments, the reaction is conducted at a temperature of at least about 80° C. In certain embodiments, the reaction is conducted at a temperature of at least about 80° C., 90° C., 100° C. or higher. The precipitate is removed to obtain a clear solution comprising sylvinite. In one embodiment, the solution is cooled to precipitate sylvite, potassium chloride. Potassium chloride is separated from brine. In one embodiment, the brine is recycled to the feedstock. In certain embodiments, solution comprising sylvinite is evaporated to obtain sylvinite. In one embodiment, sylvinite is further processed to obtain potassium chloride.

In certain embodiments, the sylvinite precipitate or sylvinite obtained by evaporation comprises at least about 10% potassium chloride by weight based on the total weight of solids. In certain embodiments, the sylvinite precipitate or sylvinite obtained by evaporation comprises at least about 20% potassium chloride by weight based on the total weight of solids. In certain embodiments, the sylvinite precipitate or sylvinite obtained by evaporation comprises at least about 30% potassium chloride by weight based on the total weight of solids. In certain embodiments, the sylvinite precipitate or sylvinite obtained by evaporation comprises at least about 40% potassium chloride by weight based on the total weight of solids. In certain embodiments, the sylvinite precipitate or sylvinite obtained by evaporation comprises at least about 50% potassium chloride by weight based on the total weight of solids. In certain embodiments, the sylvinite precipitate or sylvinite obtained by evaporation comprises about 10% to about 50%, about 20% to about 50%, about 30% to about 50%, or about 40% to about 50% potassium chloride by weight based on the total weight of solids. In certain embodiments, the sylvinite precipitate or sylvinite obtained by evaporation comprises about 10%, 20%, 30%, 40%, 42%, 45%, 50% or more potassium chloride by weight based on the total weight of solids. In certain embodiments, the sylvinite precipitate or sylvinite obtained by evaporation comprises about 10-70% or more, 20-70% or more, 30-70% or more potassium chloride by weight based on the total weight of solids. In certain embodiments, the sylvinite precipitate or sylvinite obtained by evaporation comprises about 50-95% or more, 70-95% or more, 80-95% or more, 90% or more, 95% or more potassium chloride by weight based on the total weight of solids.

In certain embodiments, the brine obtained after separating sylvinite precipitate comprises less than about 50% potassium chloride by weight based on the total weight of the brine. In certain embodiments, the brine comprises less than about 40% potassium chloride by weight based on the total weight of the brine. In certain embodiments, the brine comprises about 5% to about 50%, about 10% to about 40%, or about 20% to about 40% potassium chloride by weight based on the total weight of the precipitate. In certain embodiments, the brine comprises about 10%, 20%, 25%, 30%, 35%, 36% or 40% potassium chloride by weight based on the total weight of the brine. In one embodiment, the brine is further evaporated to obtain potassium chloride. In one embodiment, the brine is returned to the starting feed stock.

In certain embodiments, bitterns comprising magnesium in an amount of about 3.5% to about 6.7% by weight based on total weight of bitterns are used in the processes for production of potassium chloride provided herein. In one aspect, the processes comprise reacting bitterns comprise magnesium in an amount of about 3.5% to about 6.7%. In one embodiment, bitterns comprise about 2.5-4% Mg. In one embodiment, bitterns comprise about 2.5-4% K. In one embodiment, bitterns comprise about 3.5-5% Na. In one embodiment, bitterns comprise about 5.5-7.5% SO$_4$. In one embodiment, bitterns comprise about 13-16% Cl. In one embodiment, bitterns comprise about 65-70% water. In one embodiment, bitterns comprise about 3.2% Mg, about 3.1% K, about 4.8% Na and about 6.7% SO$_4$. In one embodiment, bitterns comprise about 3.20% Mg, about 3.09% K, about 4.76% Na, about 6.68% SO$_4$, about 14.56% Cl, and about 67.72% water. In one embodiment, the processes comprise reacting bitterns with calcium hydroxide or calcium oxide to obtain a precipitate comprising calcium sulfate and magnesium hydroxide. The reaction can be conducted at any temperature. In one embodiment, the reaction is conducted at a temperature of at least about 80° C. In another embodiment, the reaction is conducted at a temperature of at least about 80° C., 90° C., 100° C., 120° C. or higher. The precipitate is removed to obtain a clear solution comprising sylvinite. In one embodiment, the solution is cooled to obtain a precipitate of potassium chloride. Potassium chloride is separated from brine. In one embodiment, the brine is recycled to the feedstock. In certain embodiments, solution comprising sylvinite is evaporated to obtain sylvinite. In one embodiment, sylvinite is further processed to obtain potassium chloride.

In certain embodiments, the process for production of sylvinite from sea water or sea bittern comprises evaporating the sea water or sea bittern to obtain a mixture comprising kainite and sodium chloride; reacting the mixture with calcium hydroxide and/or calcium oxide in presence of water to obtain a precipitate and a solution, wherein the solution comprises sylvinite; and recovering sylvinite from the solution. In certain embodiments, the process for production of sylvinite from a mixture comprising kainite and sodium chloride, wherein the method comprises: reacting the mixture with calcium hydroxide and/or calcium oxide in presence of water to obtain a precipitate and a solution, wherein the solution comprises sylvinite; and recovering sylvinite from the solution. In certain embodiments, the process further comprises recovering potassium chloride from sylvinite.

In certain embodiments, the process for production of sylvinite from sea water or sea bittern comprises evaporating the sea water or sea bittern to obtain a mixture comprising carnallite, epsomite and sodium chloride; reacting the mixture with calcium hydroxide and/or calcium oxide in presence of water to obtain a precipitate and a solution, wherein the solution comprises sylvinite; and recovering sylvinite from the solution. In certain embodiments, the process for production of sylvinite from a mixture comprising carnallite, epsomite and sodium chloride, wherein the method comprises: reacting the mixture with calcium hydroxide and/or calcium oxide in presence of water to obtain a precipitate and a solution, wherein the solution comprises sylvinite; and recovering sylvinite from the solution. In certain embodiments, the process further comprises recovering potassium chloride from sylvinite.

In certain embodiments, the evaporation of sylvinite solution provides sylvinite in form of a hard crystalline bed. Sylvinite can be harvested using techniques known to one of skill in the art. Exemplary harvesting techniques are described in US Publication Nos. 2008/0220127 and 2009/0041900. In one embodiment, the hard crystal bed of sylvinite is broken by a cutting machine. Any suitable cutting machine can be used. The sylvinite crystals are broken to the desired size and stock piled with the use of regular heavy equipment, such as motor graders.

In certain embodiments, sylvinite obtained in the processes provided herein is milled to obtain homogenous particles of sylvinite. The milled sylvinite is dissolved in water at about 80-100° C. or near boiling temperature to leach potassium chloride and leave behind most of solid sodium chloride. Sodium chloride is separated to obtain a solution comprising mostly potassium chloride. Sodium chloride can be used, for example, as deicing salt.

The solution comprising potassium chloride is cooled to crystallize potassium chloride which is washed in a counter current wash leg to remove mother liquor. The washed potassium chloride is centrifuged to remove liquids.

In one embodiment, sylvinite is mixed in water at about 0° C. All of the sodium chloride and a part of the KCl in sylvinite dissolve and a part of the potassium chloride remains as solid. The solid comprising potassium chloride is centrifuged and separated.

In certain embodiments, an anti-caking agent is added in a solution form to the centrifuged cake. The anti-caking agents are added to provide a free-flowing product. The wet centrifuge cake is dried to provide potassium chloride.

Exemplary anti-caking agents include, but are not limited to sodium hexacyanoferrate (II) (YPS), potassium hexacyanoferrate (II) trihydrate (also known as potassium ferrocyanide or YPP), tricalcium phosphate and magnesium carbonate. In another embodiment, anti-caking agents include silicates, propylene glycol and polyvinyl alcohol. In one embodiment, the anti-caking agent is YPS. The anti-caking agent can be added in an amount sufficient to prevent formation of lumps or to keep potassium chloride in free flowing form. In certain embodiments, the amount of anti-caking agent YPS added to potassium chloride is less that about 20 ppm by weight. In certain embodiments, the amount of anti-caking agent YPS added to potassium chloride is less that about 20, 18 or 15 ppm by weight.

In certain embodiments, the reaction with calcium hydroxide and/or calcium oxide removes at least about 80% sulfate by weight based on total weight of sulfates in the starting material. In certain embodiments, the reaction removes at least about 80%, 90%, 95% or 99% sulfate by weight based on total weight of sulfates in the starting material. In certain embodiments, the reaction removes from about 80% to about 100%, about 90% to about 100%, or about 95% to about 100% sulfate by weight based on total weight of sulfates in the starting material.

In certain embodiments, the reaction with calcium hydroxide and/or calcium oxide and water removes at least about 80% magnesium by weight based on total weight of magnesium in the starting material. In certain embodiments, the reaction removes at least about 80%, 90%, 95% or 99% magnesium by weight based on total weight of magnesium in the starting material. In certain embodiments, the reaction removes from about 80% to about 100%, about 90% to about 100%, or about 95% to about 100% magnesium by weight based on total weight of magnesium in the starting material.

In certain embodiments, kainite and carnallite double salts used for production of potassium chloride are produced by processes known to one of skill in the art. In one embodiment, kainite and carnallite double salts are produced by solar evaporation of sea water or sea bitterns.

In certain embodiments, potassium chloride obtained by the processes provided herein is at least about 40% pure. In certain embodiments, potassium chloride obtained by the processes provided herein is about 50% to about 99% or higher, about 50% to about 90% or higher, about 50% to about 80% or higher, or about 60% to about 90% pure or higher. In certain embodiments, potassium chloride obtained by the processes provided herein is about 40%, 50%, 60%, 70%, 80%, 90%, 95% or about 99% or more pure. In certain embodiments, potassium chloride obtained by the processes provided herein is about 90%, 95% or about 99% or more pure.

6.3 Methods of Use

In certain embodiments, the process provided herein produce industrial grade potassium chloride. In certain embodiments, potassium chloride produced herein can be used as a fertilizer or as a component of a fertilizer. In another embodiment, potassium chloride is used in dyes, soaps, detergents, food, pharmaceuticals and as a starting material for preparing other potassium chemicals like potassium hydroxide and potassium carbonate. In certain embodiments, sylvinite produced herein can be uses as a low sodium salt, especially suitable for persons suffering from hypertension and heart diseases. The low sodium salt provided herein can be used as a salt substitute in food products or as a table salt in the salt shaker for tabletop use for sprinkling on prepared foods. Additionally, the low sodium salt compositions provided herein can be used in commercial food manufacturing processes, for example, to salt the processed foods. Representative foods include soups, vegetables, meat, poultry, fish, cheese, breads, snack foods, such as potato chips, pretzels, peanuts, seeds, corn chips, tortilla chips, crackers and bread sticks.

It is understood that the foregoing detailed description and accompanying examples are merely illustrative, and are not to be taken as limitations upon the scope of the subject matter. Various changes and modifications to the disclosed embodiments will be apparent to those skilled in the art. Such changes and modifications, including without limitation those relating to the methods of use provided herein, may be made without departing from the spirit and scope thereof. Patents, patent publications, and other publications referenced herein are incorporated by reference.

7. EXAMPLES

7.1 Example 1

Production of KCl, from Kainite-Sodium Chloride Mixture Kainite Production

The kainite-sodium chloride mixture obtained from sea water evaporation served as a starting feed block for the production of KCl. The mixture had the following composition (amounts in weight %):

|  | Wt % |
| --- | --- |
| Insolubles | 1.00 |
| Mg | 7.72 |
| K | 11.65 |
| Na | 8.10 |
| $SO_4$ | 29.13 |
| Cl | 22.46 |
| $H_2O$ | 19.94 |

The Kainite-NaCl mixture was reacted with $Ca(OH)_2$ to obtain a slurry containing gypsum and $Mg(OH)_2$ as solids and sylvinite in dissolved form. The slurry was filtered to remove gypsum and $Mg(OH)_2$. Sylvinite solution was evaporated to provide sylvinite bed.

Sylvinite Harvesting

The hard crystal bed of sylvinite was broken by a cutting machine. The sylvinite crystals were broken to the desired size and stock piled with the use of regular heavy equipment, such as motor graders.

Sylvinite Processing

The harvested sylvinite was trucked and fed to the milling plant where the sylvinite was milled to insure homogenous crystal size of the product. The milled sylvinite was dissolved in water at near boiling temperature for the leaching of potassium chloride. The precipitate containing sodium chloride was separated by centrifugtion and could be used as deicing salt. The solution containing mostly potassium chloride and some sodium chloride was cooled to crystallize potassium chloride. Potassium chloride was washed in a counter current wash leg to remove mother liquor. The washed potassium chloride was subjected to a centrifugation step to remove liquids. An anti caking agent YPS was added in a solution form to the centrifuges cake in less than about 20 ppm by weight. The wet centrifuge cake was dried to provide commercial grade potassium chloride.

7.2 Example 2

Production of Potassium Chloride from Kainite-NaCl Mixture

Kainite-NaCl mixture is reacted with $Ca(OH)_2$ and water at about 100° C. $Mg(OH)_2$ and calcium sulfate precipitate with excess NaCl. The solids are removed and the hot liquid containing sylvinite is separated. The hot liquid when cooled to ambient temperature yields potassium chloride as precipitate. The precipitate is separated and processes to obtain potassium chloride. The cooled liquid is returned to the reaction mixture.

7.3 Example 3

Production of Sylvinite from Carnallite-NaCl Mixture

Sea bitterns containing about 6.5% Mg were evaporated into a evaporation pond where the bitterns evaporated till the Mg concentration reached 8 to 8.5% Mg.

In the process of evaporation, a mixture of carnallite-epsomite and sodium chloride precipitated with the following composition (in weight percent):

| Mg | 8.32 |
| --- | --- |
| K | 8.04 |
| Na | 3.6 |
| $SO_4$ | 13.33 |
| Cl | 27.82 |
| $H_2O$ | 38.89 |

The carnallite-epsomite-halite mixture was separated from solution. The mixture was reacted with $Ca(OH)_2$ to remove sulfates and magnesium. The slurry containing gypsum and $Mg(OH)_2$ as solids was obtained. The solids were separated and the liquid containing sylvinite was evaporated to provide sylvinite in solid form.

The sylvinite was leached at 0° C. to obtain potassium chloride as solid and most of the sodium chloride in solution. The solid was centrifuged and dried to obtain commercial grade potassium chloride. The solution was solar evaporated or heated to 30° C. to precipitate the sodium chloride.

7.4 Example 4

Production of KCl from Sea Bitterns

Sea bitterns having the following composition is used (in weight %):

| Mg | 3.20 |
| --- | --- |
| K | 3.09 |
| Na | 4.76 |
| $SO_4$ | 6.68 |
| Cl | 14.56 |
| $H_2O$ | 67.72 |

The bitterns are reacted with $Ca(OH)_2$ to remove sulfates and magnesium. The slurry containing gypsum and $Mg(OH)_2$ as solids was obtained. The solids were separated and the liquid containing sylvinite was evaporated to provide sylvinite in solid form. Sylvinite is processed as shown above in Examples 1 or 2.

7.5 Example 5

Production of KCl, from Kainite-Sodium Chloride Mixture Kainite Production

The kainite-sodium chloride mixture obtained from sea water evaporation served as a starting feedstock for the production of KCl. The mixture had the following composition (amounts in weight %):

|  | Wt % |
| --- | --- |
| Insolubles | 1.00 |
| Mg | 7.72 |
| K | 11.65 |
| Na | 8.10 |
| $SO_4$ | 29.13 |
| Cl | 22.46 |
| $H_2O$ | 19.94 |

The kainite-NaCl mixture was reacted with $Ca(OH)_2$ in presence of a sylvinite solution to obtain a slurry containing gypsum and $Mg(OH)_2$ as solids and an end sylvinite solution. The slurry was filtered to remove gypsum and $Mg(OH)_2$. The sylvinite solution was evaporated to provide sylvinite bed of crystals.

Sylvinite Harvesting

The hard crystal bed of sylvinite was broken by a cutting machine. The sylvinite crystals were broken to the desired size and stock piled with the use of regular heavy equipment, such as motor graders.

Sylvinite Processing

The harvested sylvinite was trucked and fed to the milling plant where the sylvinite was milled to insure homogenous crystal size of the product. The milled sylvinite was dissolved in water at near boiling temperature for the leaching of potassium chloride. The undissolved solids containing sodium chloride were separated by centrifugation and sold as deicing salt. The solution containing mostly potassium chloride and some sodium chloride was cooled to crystallize potassium chloride. Potassium chloride was washed in a counter current wash leg to remove mother liquor. The washed potassium chloride was subjected to a centrifugation step to remove liquids. An anti-caking agent YPS was added in a solution form to the centrifuges cake in less than about 20 ppm by weight. The wet centrifuge cake was dried to provide commercial grade potassium chloride.

7.6 Example 6

Production of Potassium Chloride from Kainite-NaCl Mixture

Kainite-NaCl mixture was reacted with $Ca(OH)_2$ in presence of sylvinite solution at about 100° C. $Mg(OH)_2$ and calcium sulfate precipitates with excess NaCl. The solids were removed and the hot liquid containing sylvinite was separated. The hot sylvinite solution was cooled to an ambient temperature to yield potassium chloride as precipitate. The precipitate was separated and processed to obtain potassium chloride. The cooled sylvinite solution was returned to the reaction circuit.

7.7 Example 7

Production of Sylvinite from Carnallite-NaCl Mixture

Sea bitterns containing about 6.5% Mg were evaporated into a evaporation pond where the bitterns evaporated till the Mg concentration reached 8 to 8.5% Mg.

In the process of evaporation, a mixture of carnallite-epsomite and sodium chloride precipitated with the following composition (in weight percent):

| Mg | 8.32 |
| --- | --- |
| K | 8.04 |
| Na | 3.6 |
| $SO_4$ | 13.33 |
| Cl | 27.82 |
| $H_2O$ | 38.89 |

The carnallite-epsomite-halite mixture was harvested from the crystallization pond. The mixture was reacted with $Ca(OH)_2$ in the presence of sylvinite solution to remove sulfates and magnesium. The slurry containing gypsum and $Mg(OH)_2$ as solids was obtained. The solids were separated and the liquid containing an end sylvinite solution was evaporated to provide sylvinite in solid form.

The sylvinite was leached at 0° C. to obtain potassium chloride as solid and most of the sodium chloride in solution. The solid was centrifuged and dried to obtain commercial grade potassium chloride. The cooled solution was solar evaporated or heated to precipitate sodium chloride.

7.8 Example 8

Production of KCl from Sea Bitterns

Sea bitterns having the following composition is used (in weight %):

| Mg | 3.20 |
| --- | --- |
| K | 3.09 |
| Na | 4.76 |
| $SO_4$ | 6.68 |
| Cl | 14.56 |
| $H_2O$ | 67.72 |

The bitterns are reacted with $Ca(OH)_2$ to remove sulfates and magnesium. The slurry containing gypsum and $Mg(OH)_2$ as solids was obtained. The solids were separated and the liquid containing sylvinite was evaporated to provide sylvinite in solid form. Sylvinite is processed as shown above in Examples 1 or 2.

7.9 Example 9

Production of Sylvite, KCl

The kainite-NaCl mixture as in Example 5, was reacted with $Ca(OH)_2$ in the presence of a sylvinite solution to obtain a slurry containing fine particles of gypsum, $Mg(OH)_2$ and KCl, and coarse NaCl solids. The slurry was screened to remove the coarse NaCl then filtered to remove gypsum, $Mg(OH)_2$ and KCl solids. The KCl was leached from the fine particles. The sylvite solution was evaporated to provide sylvite bed of crystals.

7.10 Example 10

Production of Sylvite, KCl

In the process described in Example 9, the slurry was filtered to provide a filter cake of $Mg(OH)_2$, $CaSO_4.2H_2O$, KCl and NaCl from which KCl was leached at elevated temperature to provide a solution containing KCl. The KCl solution was evaporated to provide a sylvite bed of crystals.

Sylvite Harvesting

The hard crystal bed of sylvite was broken by a cutting machine. The sylvite, KCl crystals were broken to the desired size and stock piled with the use of regular heavy equipment, such as motor graders.

Sylvite Processing

The harvested sylvite was trucked and fed to the milling plant where the sylvite was milled to insure homogenous crystal size of the product. The milled sylvite was washed, filtered and dried.

All publications, patents and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A process for production of sylvinite and/or sylvite from sea water comprising:
   a) evaporating the sea water to obtain a mixture, wherein the mixture comprises predominantly kainite and further comprises sodium chloride;
   b) reacting the mixture with calcium hydroxide and/or calcium oxide in presence of a sylvinite solution or water to obtain a precipitate and an end sylvinite solution, wherein the precipitate comprises $Mg(OH)_2$ and $CaSO_4.2H_2O$; and
   c) recovering sylvinite and/or sylvite from the end sylvinite solution.

2. A process for production of sylvinite and/or sylvite from sea water comprising:
   a) evaporating the sea water to obtain a mixture, wherein the mixture comprises predominantly carnallite and further comprises epsomite and sodium chloride;
   b) reacting the mixture with calcium hydroxide and/or calcium oxide in presence of a sylvinite solution or water to obtain a precipitate and an end sylvinite solution, wherein the precipitate comprises $Mg(OH)_2$ and $CaSO_4.2H_2O$; and
   c) recovering sylvinite and/or sylvite from the end sylvinite solution.

3. A process for production of sylvite from sea water comprising:
   a) evaporating the sea water to obtain a mixture, wherein the mixture comprises predominantly kainite and further comprises sodium chloride;
   b) reacting the mixture with calcium hydroxide and/or calcium oxide in presence of a sylvinite solution or water to obtain a precipitate and an end sylvinite solution, wherein the precipitate comprises $Mg(OH)_2$ and $CaSO_4.2H_2O$; and
   c) recovering sylvite from the end sylvinite solution.

4. A process for production of sylvite from sea water comprising:
   a) evaporating the sea water to obtain a mixture, wherein the mixture comprises predominantly carnallite and further comprises epsomite and sodium chloride;
   b) reacting the mixture with calcium hydroxide and/or calcium oxide in presence of a sylvinite solution or water to obtain a precipitate and an end sylvinite solution, wherein the precipitate comprises $Mg(OH)_2$ and $CaSO_4.2H_2O$; and
   c) recovering sylvite from the end sylvinite solution.

5. The process of claim 1, wherein the evaporation of sea water in step a) is continued till the sea water comprises between about 3.5% to about 6.7% magnesium by weight to form the mixture.

6. The process of claim 1, wherein the reaction in step b) is conducted at a temperature of at least about 80° C.

7. The process of claim 1, wherein the reaction in step b) is conducted at a temperature from about 80° C. up to about 100° C.

8. The process of claim 1, wherein sylvinite is recovered in step c), and the process further comprises a step of leaching KCl from the sylvinite at an elevated temperature to obtain a leached solution.

9. The process of claim 8, wherein the leaching step is followed by cooling or evaporation of the leached solution to recover KCl.

10. The process of claim 1, wherein the end sylvinite solution in step b) is saturated with respect to NaCl and KCl.

11. The process of claim 1, wherein the reaction of the mixture with calcium hydroxide and/or calcium oxide in step b) is conducted in presence of the sylvinite solution, and the sylvinite solution is saturated with respect to NaCl and under saturated with respect to KCl.

12. The process of claim 1, wherein the reaction of the mixture with calcium hydroxide and/or calcium oxide in step b) is conducted in presence of the sylvinite solution, and the sylvinite solution is under saturated with respect to both NaCl and KCl.

13. The process of claim 12, wherein the end sylvinite solution is saturated with respect to both KCl and NaCl.

14. The process of claim 1, wherein sylvite is recovered in step c), and the sylvite is about 90% to about 99% pure.

15. The process of claim 1, wherein sylvite is recovered in step c) and the process further comprises adding an anti-caking agent to the sylvite.

16. The process of claim 15, wherein the anti-caking agent is sodium hexacyanoferrate (II).

17. The process of claim 1, wherein in step b) the mixture is reacted with calcium hydroxide.

18. The process of claim 1, wherein in step b) the mixture is reacted with calcium oxide.

19. The process of claim 2, wherein the evaporation of sea water in step a) is continued till the sea water comprises between about 6.5% to 8.5% magnesium by weight to form the mixture.

20. The process of claim 2, wherein the reaction in step b) is conducted at a temperature of at least about 80° C.

21. The process of claim 2, wherein sylvinite is recovered in step c), and the process further comprises a step of leaching KCl from the sylvinite at an elevated temperature to obtain a leached solution.

22. The process of claim 21, wherein the leaching step is followed by cooling or evaporation of the leached solution to recover KCl.

23. The process of claim 2, wherein the end sylvinite solution in step b) is saturated with respect to NaCl and KCl.

24. The process of claim 2, wherein the reaction of the mixture with calcium hydroxide and/or calcium oxide in step b) is conducted in presence of the sylvinite solution, and the sylvinite solution is saturated with respect to NaCl and under saturated with respect to KCl.

25. The process of claim 2, wherein the reaction of the mixture with calcium hydroxide and/or calcium oxide in step b) is conducted in presence of the sylvinite solution, and the sylvinite solution is under saturated with respect to both NaCl and KCl.

26. The process of claim 25, wherein the end sylvinite solution is saturated with respect to both KCl and NaCl.

27. The process of claim 2, wherein sylvite is recovered in step c) and the sylvite is about 90% to about 99% pure.

* * * * *